(12) United States Patent
Kodim

(10) Patent No.: US 7,005,940 B2
(45) Date of Patent: Feb. 28, 2006

(54) MULTIBAND R. F. SWITCHING DEVICE

(75) Inventor: Walter Kodim, Nuremberg (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 10/468,916

(22) PCT Filed: Feb. 27, 2002

(86) PCT No.: PCT/EP02/02090

§ 371 (c)(1),
(2), (4) Date: Dec. 9, 2003

(87) PCT Pub. No.: WO02/069435

PCT Pub. Date: Sep. 6, 2002

(65) Prior Publication Data

US 2004/0092285 A1    May 13, 2004

(30) Foreign Application Priority Data

Feb. 27, 2001  (EP) ................................. 01104812

(51) Int. Cl.
*H01P 1/10* (2006.01)
*H04B 1/44* (2006.01)
(52) U.S. Cl. .................... 333/101; 333/104; 455/78
(58) Field of Classification Search ............ 333/101, 333/103, 104, 124, 125, 126, 127; 455/78, 455/83, 552.1
See application file for complete search history.

(56) References Cited

U.S. PATENT DOCUMENTS

| | | | | |
|---|---|---|---|---|
| 5,513,382 A | * | 4/1996 | Agahi-Kesheh et al. | 455/83 |
| 6,021,318 A | * | 2/2000 | Schaffer | 455/78 |
| 6,070,059 A | * | 5/2000 | Kato et al. | 455/78 |
| 6,489,843 B1 | * | 12/2002 | Nishijima et al. | 330/51 |
| 6,795,714 B1 | * | 9/2004 | Fickenscher et al. | 455/552.1 |
| 6,847,829 B1 | * | 1/2005 | Tanaka et al. | 455/552.1 |

FOREIGN PATENT DOCUMENTS

| | | |
|---|---|---|
| DE | 197 04 151 C1 | 8/1998 |
| DE | 199 19 368 A1 | 11/2000 |
| EP | 0 446 050 A2 | 9/1991 |
| EP | 0 578 160 A1 | 1/1994 |
| EP | 1 006 669 A | 6/2000 |
| WO | 88/00760 A1 | 1/1988 |
| WO | 00/41326 A | 7/2000 |
| WO | 00/49675 A | 8/2000 |

OTHER PUBLICATIONS

Patent Abstracts of Japan, vol. 2000, No. 03, Mar. 30, 2000 & JP 11 340872 A (Kyocera Corp.), Dec. 10, 1999.

(Continued)

*Primary Examiner*—Dean Takaoka
(74) *Attorney, Agent, or Firm*—Nixon & Vanderhye, P.C.

(57) ABSTRACT

A multiband transformation stage (14) comprising a common first signal port (20), a common second signal port (26) and a signal path (50) coupled between the first signal port (20) and the second signal port (26) is described. The signal path (50) is switchable between a first state with a first quarter-wavelength transformer characteristic for a first frequency band, a second state with a second quarter-wavelength transformer characteristic for a second frequency band and a third state with a transmission characteristic. The invention also relates to a multiband switching device comprising the multiband transformation stage (14) in combination with a low-power switching stage (16).

13 Claims, 7 Drawing Sheets

OTHER PUBLICATIONS

Patent Abstracts of Japan, vol. 1997, No. 09, Sep. 30, 1997 & JP 09 139601 A (Fujitsu Ltd), May 27, 1997.

European Search Report mailed Jul. 17, 2001 in corresponding EP application No. 01104812.1-2220.

International Search Report mailed May 29, 2002 in corresponding PCT application PCT/EP02/02090.

International Preliminary Examination Report mailed Feb. 11, 2003 in corresponding PCT Application No. PCT/EP02/02090.

* cited by examiner

| MULTI-BAND ANTENNA SWITCH Simulation models / data sets | Description |
|---|---|
| PIN-diode BAR63 | Measurement result, s-parameter data set, <br><br> OFF state: = I$_{PIN}$ = 0mA, no backbiasing <br> ON state: = I$_{PIN}$ = 20mA |
| TL1, TL2 | HPADS model Micro-strip line model, Er=4.2, TanD=0.033 |
| L3, L4 | HPADS inductor model, L1=L2=47nH, Q=5 |
| C1, C2 | HPADS ideal capacitor model, C1= 6.5pF, C2=33pF |

*Fig. 5*

| MULTI-BAND ANTENNA SWITCH MODE | PIN diode state | | | | Insertion loss (frequency) |
|---|---|---|---|---|---|
| | D1 | D2 | D3 | D4 | |
| RX_GSM900_GSM1800_GSM1900 | OFF | OFF | OFF | OFF | 1.1dB (940MHz) |
| | | | | | 1.2dB (1840MHz) |
| | | | | | 1.3dB (1960MHz) |
| TX_GSM900 | OFF | ON | ON | OFF | 0.8dB (900MHz) |
| TX_GSM1800 | ON | OFF | OFF | ON | 1.1dB (1750MHz) |
| TX_GSM1900 | | | | | 1.0dB (1880MHz) |

Fig. 6

MULTIBAND R. F. SWITCHING DEVICE

This application is the U.S. National phase of international application PCT/EP02/02090 filed 27 Feb. 2002 which designates the U.S.

BACKGROUND OF THE INVENTION

1. Technical Field of the Invention

The invention relates to the field of radio frequency (R.F.) circuits and in particular to multiband R.F. circuits adapted to two or more R.F. frequency bands like the frequency bands defined for the global system for mobile communication (GSM), e.g. 450 MHz (GSM 450), 900 MHz (GSM 900), 1800 MHz (GSM 1800) and 1900 MHz (GSM 1900).

2. Description of the Prior Art

R.F. circuits are utilized for a large variety of different applications. As an example, antenna switching circuits for mobile telephones can be mentioned. Mobile telephones adapted to the time division multiple access (TDMA) mode, for example GSM systems, are commonly using antenna switches for coupling an antenna port to either a transmitter path or a receiver path of the mobile telephone.

An antenna switch for a single frequency band and consisting essentially of two pin-diodes and a quarter-wavelength transformer is known from WO 88/00760. The antenna switch is depicted in FIG. 1. In a transmit mode, both pin-diodes D1 and D2 are switched on. A transmitter port $P_{TX}$ is thus connected to an antenna port $P_{ANT}$ via a first pin-diode D1. A receiver port $P_{RX}$ is connected to ground via a second pin-diode D2 and the resulting short circuit at receiver port $P_{RX}$ is transformed by the quarter-wavelength transformer to an open circuit at antenna port $P_{ANT}$. Receiver port $P_{RX}$ is thus isolated from antenna port $P_{ANT}$. In a receive mode both pin-diodes D1 and D2 are switched off. In the receive mode, transmitter port $P_{TX}$ is virtually disconnected from antenna port $P_{ANT}$ and receiver port $P_{RX}$ is connected to antenna port $P_{ANT}$ via the quarter-wavelength transformer. The switching state (on/off) of pin-diodes D1 and D2 is controlled by means of a control voltage $V_{DC}$ applied to a control port. Inductor L1 provides a DC path to pin-diodes D1 and D2 and resister R1 sets the DC current through pin-diodes D1 and D2.

For mobile telephones operable in a dual frequency band mode or in a triple frequency band mode the antenna switch depicted in FIG. 1 has to be modified. In dual band applications like GSM 900/GSM 1800 or GSM 900/GSM 1900 for example a diplexer circuit may be inserted into the common antenna path. The diplexer circuit splits incoming antenna signals into high-band signals and low-band signals. The incoming high-band signals and low-band signals are thereafter individually applied to separate antenna switches. Thus a first antenna switch for high-band signals and a second antenna switch for low-band signals has to be provided, each antenna switch further splitting the antenna path into a transmitter path and a receiver path. Triple-band applications like GSM 900/GSM 1800/GSM 1900 usually also utilize a single diplexer circuit for splitting the common antenna path into a low-band signal path (GSM 900)/and a combined high-band signal path (GSM 1800/GSM 1900).

The use of a diplexer circuit for splitting a signal incident at the antenna port into low-band and high-band signals leads to a rather complex circuit design. Therefore, antenna switches configured to also perform the signal splitting function of a diplexer circuit have been proposed.

An antenna switch for coupling a single antenna to either one of a first and a second receiver, operable at a first and a second frequency band, respectively, and a first and a second transmitter, operable to transmit at the first and the second frequency band, respectively, is known from DE 197 04 151. The antenna switch has a multiband transformation stage 100 as schematically depicted in FIG. 2. The multiband transformation stage 100 comprises a common signal input 102, two separate signal outputs 104, 106, two quarter-wavelength transformers SL1, SL2 coupled in series and three switching elements SE3, SE4, SE5.

The two quarter-wavelength transformers SL1, SL2 coupled in series represent together a quarter-wavelength transmission line at a first frequency band and each single quarter-wavelength transformer SL1, SL2 represents a quarter-wavelength transmission line for a second frequency band equaling approximately twice the first frequency band.

Signal input 102 of the multiband transformation stage 100 is usually coupled to an antenna and to a multiband transmitter switch for coupling either a first transmitter operable in the first frequency band or a second transmitter operable in the second frequency band to the antenna. First signal output 104 may be coupled to a first receiver receiving in the first frequency band and second signal output 106 may be coupled to a second receiver receiving in the second frequency band.

The multiband transformation stage 100 has four operational states. In a first operational state corresponding to transmission in the first frequency band, switching elements SE3 and SE4 are switched off and switching element SE5 is switched on. The short circuit created by switching element SE5 at a node 108 is transformed to an open circuit for the first frequency band at signal input 102 of the multiband transformation stage 100. In a second operational mode corresponding to transmission in the second frequency band, switching element SE3 is switched on and switching elements SE4 and SE5 are switched off. Switching element SE3 thus creates a short circuit at a node 110. This short circuit is transformed by the quarter-wavelength transmission line SL1 to an open circuit for the second frequency band at signal input 102. In a third operational state corresponding to receiving in the first frequency band, switching elements SE3, SE4 and SE5 are turned off. Consequently, first signal output 104 is coupled impedance-matched via the two quarter-wavelength transmission lines SL1, SL2 with signal input 102. In a fourth operational state corresponding to receiving in the second frequency band, switching element SE3 is turned off and switching elements SE4, SE5 are turned on. This means that second signal output 106 is coupled impedance-matched via first quarter-wavelength transmission line SL1 with signal input 102. Further, the short circuit created by switching element SE5 is transformed by second quarter-wavelength transmission line SL2, which has a quarter-wavelength characteristic for the second frequency band, into an open circuit at second output port 106.

The fourth operational stage necessitates that the two quarter-wavelength transmission lines SL1, SL2 have an identical transformation characteristic. This requirement, however, limits the applicability of the multiband transformation stage 100 depicted in FIG. 2 to the case where the first frequency band equals approximately half the second frequency band. A further disadvantage of the multiband transformation stage 100 is the fact that in the fourth operational state, i.e. in high-band receive mode, two switching elements SE4, SE5 are in an on state. This leads to a considerable current consumption in the order of milliamperes and reduces the stand-by time of battery-powered devices. Moreover, the multiband transformation stage 100 comprises altogether three switching elements SE3, SE4, SE5 which have to be biased. This requires a comparatively complex biasing network. The biasing network becomes even more complex if the multiband transformation stage 100 has to be adapted for triple-band applications.

Also, the multiband transformation stage 100 suffers from limited isolation between signal input 102 which may be coupled to transmitters and signal outputs 104, 106 which may be coupled to receivers. This means that terminations of signal outputs 104, 106 become relevant in the first two operational states, i.e. in transmit modes. Terminations of output ports 104, 106, however, are difficult to design due to the constraints imposed by the receivers coupled to output ports 104, 106.

A further multiband switching device with a multiband transformation stage is known from WO00/41326. The multiband switching device is utilized for switching an antenna port between two power amplifier ports and a receive port. The multiband transformation stage comprises one or more diode switches positioned between a first one of the amplifier ports, a second one of the amplifier ports and ground. One or a plurality of frequency dependent isolation sections are positioned between the first amplifier port, the second amplifier port and the receive port so that the diode switches are controlled using a respective control input for connecting either the first amplifier port, the second amplifier port or the receive port to the antenna port. As far as the low-power side of the multiband switching device known from WO00/41326 is concerned, the transformation stage suffers from a low flexibility.

There is, therefore, a need for a multiband switching device which does not suffer from the limitations of the prior art switching devices.

SUMMARY

The existing need is satisfied according to the invention by a multiband switching device comprising a multiband transformation stage and a low-power stage. The multiband transformation stage has a first common signal port, a second common signal port and a signal path coupled between the first common signal port and the second common signal port, the signal path being switchable between a first state with a first quarter-wavelength transformer characteristic for a first frequency band, a second state with a second quarter-wavelength transformer characteristic for a second frequency band and a third state with a transmission characteristic for at least the first frequency band and the second frequency band. The low-power stage, which may be realized in the form of a low-power switch, has a first signal port coupled to the second signal port of the multiband transformation stage and a plurality of second signal ports which may be coupled to the first signal port of the low-power stage.

The multiband switching device according to the invention can be used in all multiband environments that require a transformation stage that enables coupling of an electrical component to an input/output port in a first mode (third state of the multiband transformation stage) and decoupling of the electrical component from the input/output port in a second mode (first state and second state of the multiband transformation stage). Preferably, the multiband transformation stage is used to decouple in a transmit mode a multiband transmitter switch, which is coupled to an antenna port, from a multiband receiver switch or a multiband transmitter/receiver switch, which is coupled to the antenna port via the multiband transformation stage.

The multiband transformation stage may easily be adapted to more than two different frequency bands, for example to triple-band or quadruple-band applications. In this case the signal path may be switchable among further states, each further state corresponding to an individual quarter-wavelength transmission characteristic for an individual further frequency band. If frequency bands are only slightly spaced apart, however, a single state may be allocated to such frequency bands since a state having a quarter-wavelength transmission characteristic for one of these frequency bands will also have a fairly good quarter-wavelength transmission characteristic for nearby further frequency bands.

According to the invention, a signal fed in the third state into the multiband transformation stage via one of its common signal ports is transferred to the other common signal port regardless of its frequency. If desired, individual signal paths for individual frequency bands may therefore be selected only after the signal is output by the multiband transformation stage. For example, one common signal port may be split up into several individual ports. Since the signal path needs not necessarily be selected within the multiband transformation stage there are less constraints with respect to the construction of the multiband transformation stage. This allows a less sophisticated and a more flexible realization of the multiband transmission stage.

For example, the third state of the signal path can be realized without the need to turn any switching elements on. The power consumption in the third state can thus be kept very low. Moreover, the use of the multiband transformation stage is no longer limited to frequency bands having a specific frequency ratio. Also, when splitting up the signal path after the signal has propagated through the multiband transformation stage, specific termination ports having a predetermined termination impedance can be provided, thus enhancing isolation of the multiband transformation stage in the first and second state of the signal path.

The switchable signal path of the multiband transformation stage can be realized in various ways. According to a preferred embodiment, the signal path has two signal path portions coupled in series. For example, a first signal path portion is coupled between the first signal port of the multiband transformation stage and a first node and a second signal path portion is coupled between the first node and the second signal port of the multiband transformation stage. Preferably, each signal path portion has a specific quarter-wavelength characteristic. The quarter-wavelength characteristics of the individual signal path portions can be chosen such that the first signal path portion has a quarter-wavelength characteristic for the first frequency band and that the first signal path portion and the second signal path portion together have a quarter-wavelength characteristic for the second frequency band.

If the multiband transformation stage is used in a multiband environment in which a third frequency band appears which has a greater distance from the first and the second frequency bands, the signal path may comprise a third signal path portion. This third signal path portion can be coupled in series with the first and the second signal path portions and may have a quarter-wavelength characteristic which is chosen such that the three quarter-wavelength portions together have a quarter-wavelength characteristic for the third frequency band. This concept can analogously be extended if four or more substantially different frequency bands are employed.

The switching of the signal path may be performed by means of switching elements which are preferably independently switchable from each other. One switching element may be provided for each signal path portion. One switching element each may be coupled to one of the two ends of a respective signal path portion. The switching elements may be arranged such that they allow to selectively short-circuit the respective ends of the signal path portions. Due to the quarter-wavelength characteristic of each signal path portion the short circuit is transformed, for a specific frequency band, to an open circuit at one of the signal ports of the multiband transformation stage. By appropriately switching the single switching elements the signal path thus becomes tunable with respect to various quarter-wavelength characteristics.

According to a preferred embodiment, the multiband transformation stage is constructed in multi-layer technology or with discrete components. Due to the fact that the multiband transformation stage is of comparatively low complexity, standardized low price multi-layer technology can be used. Preferably, the multiband transformation stage is realized as an individual device which allows to insert the multiband transformation stage in a modular manner in existing environments.

The multiband transformation stage according to the invention can advantageously be employed for realizing multiband switching devices like multiband antenna switches. A multiband switching device may comprise at least one of a high-power stage coupled to the first signal port of the multiband transformation stage and the low-power stage coupled to the second signal port of the multiband transformation stage. Preferably, the multiband switching device further comprises a common node to which an input/output port, the high-power stage and the first signal port of the multiband transformation stage is coupled.

The multiband transformation stage may be used to decouple the high-power stage from the low-power stage. Also, the multiband transformation stage can be used to appropriately terminate the common node of the high-power stage, the input/output port and the signal ports of the multiband transformation stage. Thus, a pre-defined impedance at the common node can reproducibly be realized.

By means of the low-power stage (functioning as a low-power switch) the single signal path of the multiband transformation stage can selectively be connected to one of the plurality of second signal ports of the low-power stage. For example, the low-power switch may have an individual signal input or output port for each frequency band. In the case of mobile telephones operable for example in a GSM 900, GSM 1800 and GSM 1900 mode, the low-power switch may thus comprise three corresponding second signal ports configured as signal output ports. The low-power switch may have additional second signal input or output ports for signals such as a low-power transmitter signal, a global positioning system (GPS) signal or a Bluetooth signal.

Also, the low-power stage can have one or more second signal ports which are configured as auxiliary ports. The auxiliary ports can be terminated with different pre-determined impedances. By coupling the multiband transformation stage by means of the low-power switch to a pre-determined impedance a high isolation of the multiband transformation stage can be achieved. According to a further option, the one or more auxiliary ports can serve as input ports for a DC voltage. The DC voltage can e.g. be used for controlling switching elements or other components of the multiband transformation stage.

Preferably, the low-power switch is realized as a microwave monolithic integrated circuit (MMIC) device. Since the multiband transformation stage ensures a good isolation between the high-power stage and the low-power stage, it becomes possible to use low-power MMIC devices, i.e. standard MMIC devices already available from a large number of suppliers at a comparatively low price. MMIC low-power switches have the additional advantage that the number of second signal ports of the low-power switch can easily be increased up to five or more. The number of e.g. signal output ports is thus no longer restricted by the design of the multiband transformation stage. Moreover, the power consumption of MMIC devices is comparatively low. Therefore, the overall power consumption of the multiband switching device is also low, especially when the switching elements of the multiband transformation stage are switched off.

Modular MMIC low-power stages can advantageously be combined with modular multiband transformation stages and high-power stages constructed in multi-layer technology or with discrete components. The modular concept allows a multi-sourcing of the individual modular stages from different suppliers and is thus suitable for very high volume products. Moreover, the modular concept minimizes design risks since the modular stages of the multiband switching device can be split up and verified separately. Also, the modular concept leads to more flexibility in printed circuit board (PCB) design due to the possibility of splitting of the individual modular stages.

The multiband switching device is preferably employed as an antenna switch in mobile telephones. The low-power switch can thus be configured as a multiband receiver switch. Also, the low-power switch may be configured as a multiband transmitter/receiver switch provided that the multiband transmitter/receiver switch is subjected to only low transmit powers. Thus, low-power transmit signals may be fed into the antenna switch via the low-power stage. The high-power stage can comprise a multiband transmitter switch.

BRIEF DESCRIPTION OF THE DRAWINGS

Further aspects and advantages of the invention will become apparent upon reading the following detailed description of a preferred embodiment of the invention and upon reference to the drawings, in which:

FIG. 5 is a table showing simulation models and data sets used for the simulation setup of FIG. 4; and FIG. 6 shows the simulation results of the simulation setup of FIG. 4.

DESCRIPTION OF A PREFERRED EMBODIMENT

Figure 3A:
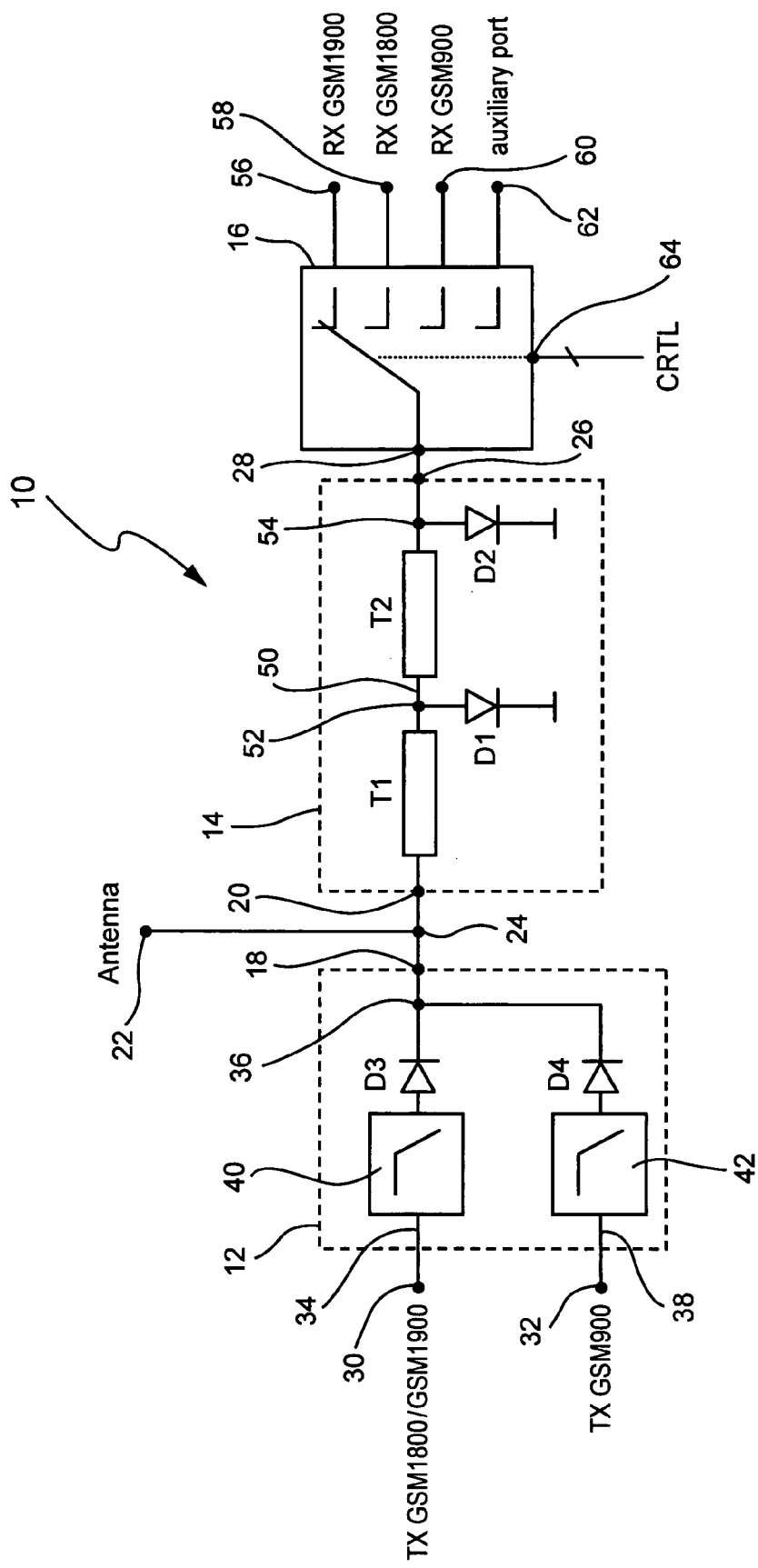
FIG. 3a is a schematic diagram of a triple-band antenna switch according to example embodiment.

In FIG. 3a a schematic diagram of a first embodiment of a multiband switching device according to the invention in the form of a triple-band antenna switch 10 is illustrated. The antenna switch 10 is part of a mobile telephone operable in three frequency bands in accordance with GSM 900, GSM 1800 and GSM 1900.

The antenna switch 10 depicted in FIG. 3a has a modular structure and essentially comprises a high-power stage 12, a multiband transformation stage 14 and a low-power stage 16. A signal output 18 of the high-power stage 12, a first signal port 20 of the multiband transformation stage 14 and an input/output port configured as antenna port 22 are each coupled to a node 24. A second signal port 26 of the multiband transformation stage 14 is connected to a signal input port 28 of the low-power stage 16.

Figure 1:
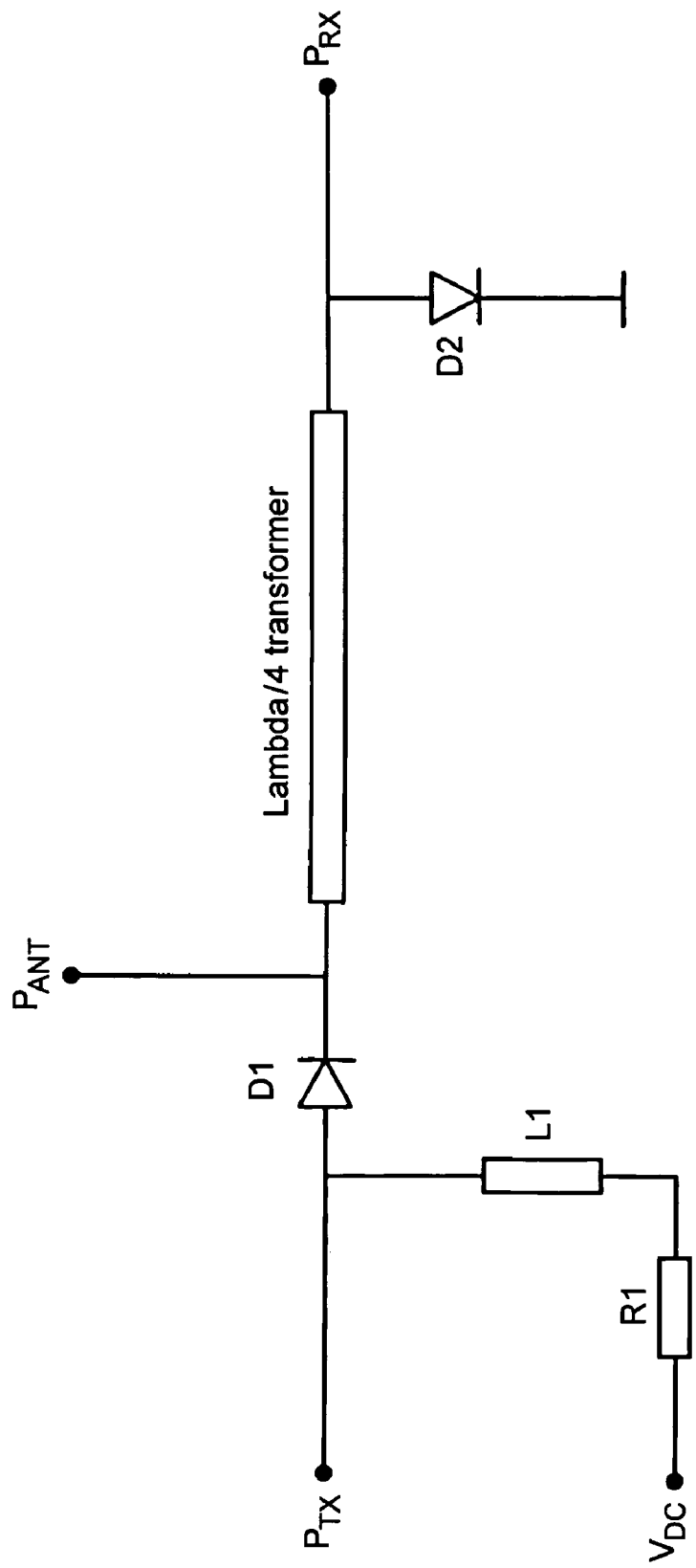
FIG. 1 is a schematic diagram of a prior art single band antenna switch.
Figure 2:
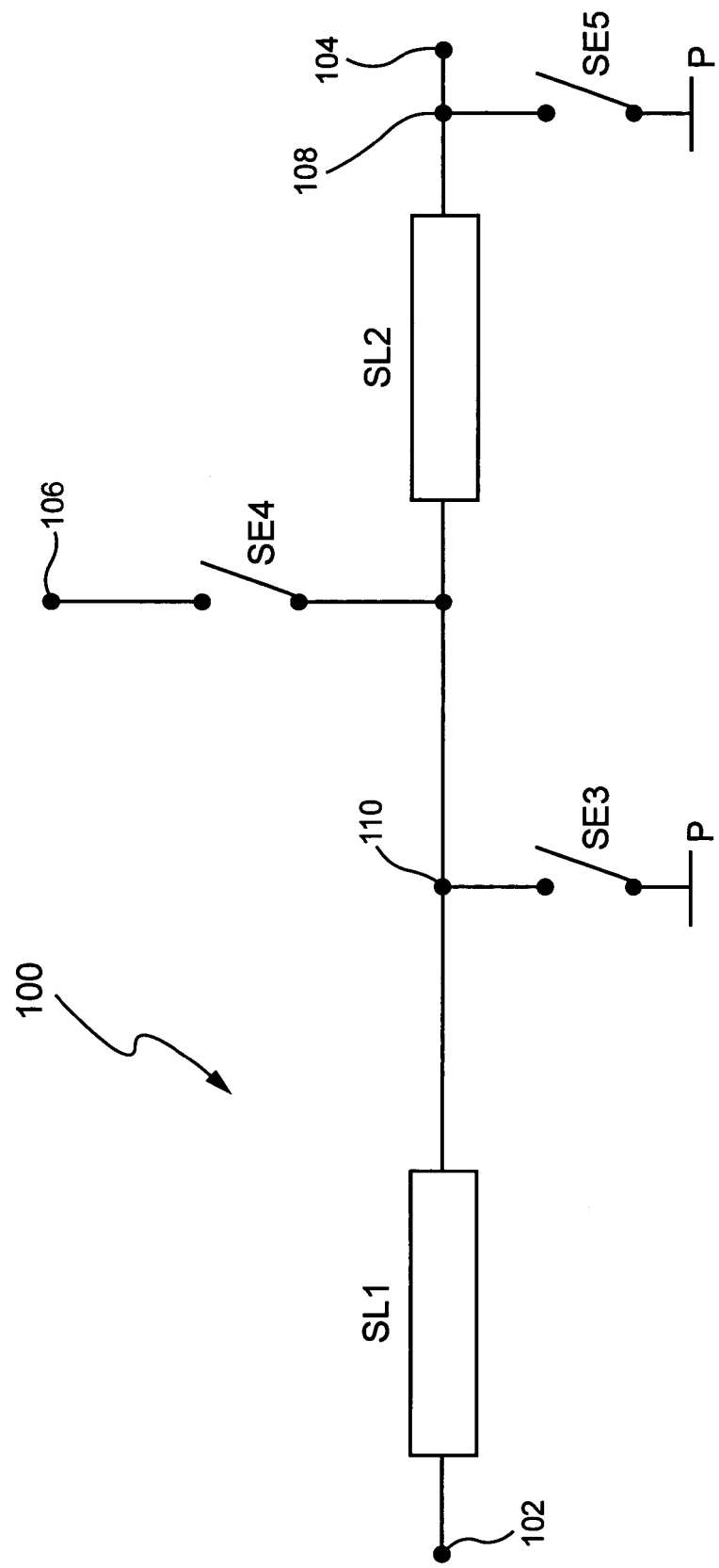
FIG. 2 is a schematic diagram of a prior art dual-band antenna switch.

The high-power stage 12 is constructed in multi-layer technology and is used as a multiband transmitter switch. It comprises a first signal input 30 and a second signal input 32 coupled to respective transmitters not depicted in FIG. 3a. The first signal input 30 is used as common GSM 1800/GSM 1900 signal input, i.e. as high-band signal input. The second input 32 is used as GSM 900 signal input, i.e. as low-band signal input. A first high-power signal path 34 is coupled between the high-band signal input 30 and a node 36. A second high-power signal path 38 is coupled between the low-band signal input 32 and the node 36. Each high-power signal path 34, 38 comprises a low-pass filter 40, 42 followed by a switching element in the form of a pin-diode D3, D4. The low-pass filters 40, 42 reduce the level of spurious transmitter signals at harmonic frequencies. The high-power stage 12 further comprises an individual biasing network not depicted in FIG. 3 for each pin-diode D3, D4. Each biasing network may be configured like the biasing network depicted in FIG. 1.

The multiband transformation stage 14 has a single signal path 50 which connects the first signal port 20 and the second signal port 26 of the multiband transformation stage 14. The signal path 50 comprises by two signal path portions in the form of a first transmission line T1 and a second transmission line T2 coupled in series. The first transmission line T1 is configured to have approximately a quarter-wavelength characteristic for the two frequency bands of 1800 MHz and 1900 MHz corresponding to GSM 1800 and GSM 1900. The second transmission line T2 is configured such that the two transmission lines T1 and T2 coupled in series have approximately a quarter-wavelength characteristic for the frequency band of 900 MHz corresponding to GSM 900.

The multiband transformation stage 14 further comprises two switching elements in the form of pin-diodes D1, D2. The two pin-diodes D1, D2 can be switched independently from each other by means of individual biasing networks not depicted in FIG. 3a. Each biasing network may be configured like the biasing network depicted in FIG. 1 and may comprise an inductor and a resistor. The first pin-diode D1 is coupled between ground and a node 52 connecting the two transmission lines T1, T2. The second pin-diode D2 is coupled between a node 54 and ground. The node 54 is further coupled to the second signal port 26 of the multiband transformation stage 14 and an end of the second transmission line T2 which faces the low-power stage 16.

The multiband transformation stage 14 is also constructed in multi-layer technology. In accordance with the modular aspect, the high-power stage 12 and the multiband transformation stage 14 are realized as individual stages on different substrates. Alternatively, the high-power stage 12 and the multiband transformation stage 14 could be integrated on a single multi-layer substrate.

The low-power stage 16 is basically a receive switch matrix with a signal input port 28 coupled to the second signal port 26 of the multiband transformation stage 14, three signal output ports 56, 58, 60 and an auxiliary port 62. The low-power stage 16 has a signal input 64 for a control signal which specifies which of the ports 56, 58, 60, 62 is to be coupled to the signal input port 28 of the low-power stage 16. The low-power stage 16 has one signal output port for each frequency band. The signal output port 56 defines the 1900 MHz signal path and is coupled to a 1900 MHz receiver. The signal output port 58 defines the 1800 MHZ signal path and is coupled to a 1800 MHz receiver. Finally, the signal output port 60 defines the 900 MHz signal path and is coupled to a 900 MHz receiver. The receivers are not depicted in FIG. 3a. The auxiliary port 62 is terminated with a pre-defined fixed impedance. The function of the auxiliary port will be described later in more detail.

The different operational modes of the antenna switch 10 are described with reference to the following table:

| mode | state of signal path 50 | D1 | D2 |
|---|---|---|---|
| transmit GSM 900 | 1 | OFF | ON |
| transmit GSM 1800/GSM 1900 | 2 | ON | OFF |
| receive GSM 900/GSM 1800/ GSM 1900 | 3 | OFF | OFF |

First, the high-band transmit mode, i.e. transmission in the 1800 MHz band or 1900 MHz band, is described. In the high-band transmit mode either a GSM 1800 transmitter signal or a GSM 1900 transmitter signal is applied to the first signal input 30 of the high-power stage 12. Pin-diode D3 is switched on and pin-diode D4 is switched off. Consequently, either the GSM 1800 transmitter signal or the GSM 1900 transmitter signal is fed to the antenna port 22. In the multiband transformation stage 14 pin-diode D1 is switched on and pin-diode D2 is switched off during high-band transmission. This corresponds to the second state of the signal path 50 in which the short circuit at node 52 is transformed by the first transmission line T1, which has a quarter-wavelength transformer characteristic at high-band frequencies, to an open circuit at the first signal port 20 of the multiband transformation stage 14. Consequently, the low-power stage 16 remains isolated from the high power stage 12 and the antenna port 22.

In the low-band transmit mode a GSM 900 transmitter signal is applied to the second signal input 32 of the high-power stage 12. Pin-diode D3 is switched off and pin-diode D4 is switched on. Consequently, the GSM 900 transmitter signal is fed to the antenna port 22. In the multiband transformation stage 14 pin-diode D1 is switched off and pin-diode D2 is switched on in the low-band transmission mode. This corresponds to the first state of the signal path 50 of the multiband transformation stage 14 in which the signal path 50 has a quarter wavelength transformer characteristic for the 900 MHz transmitter signal. The short circuit at node 54 is transformed by the two transmission lines T1, T2 to an open circuit at the first signal port 20 of the multiband transformation stage 14. Consequently, the low-power stage 16 is isolated from both the high-power stage 12 and the antenna port 22 in the low-band transmit mode.

The low-power stage 16 is configured as a GaAs MMIC receiver switch matrix. Such GaAs MMIC devices usually generate spurious signals at harmonic frequencies in response to high-power output signals in transmit modes. These spurious signals are generated internally and appear finally at the antenna port 22. However, no further low-pass filtering can be provided at the antenna port 22. Therefore, spurious signals have to be kept below certain limits specified in e.g. the GSM standard. In the antenna switch 10 according to FIG. 3a transmitter signals present at node 24 are sufficiently attenuated by the amount of isolation provided by the multiband transformation stage 14 such that spurious signal generation within the low-power stage 16 is kept small even without taking further measures.

In the high-band and low-band transmit modes the low-power stage 16 is switched such that the signal output 26 of the multiband transformation stage 14 is coupled to the auxiliary port 62 which is terminated with a specific impedance. Such a fixed termination is advantageous because it has been found that stop-band attenuation of the low-pass filters 40, 42 arranged within the high-power stage 12 is effected by the impedance present at node 24. Best transmission performance is achieved when the system impedance of for example 50 Ohm is present at node 24. In the prior art depicted in FIG. 1, however, it was observed that unused ports like the signal outputs 104, 106 coupled to both the signal input 102 and corresponding receivers exhibit a varying impedance in the transmit modes. This is due to the fact that receiver filters lead to a mismatch at the signal outputs 104, 106 in the transmit mode. A varying impedance at the signal outputs 104, 106, however, may modify the impedance of the switching elements SE3, SE4, SE5 of the multiband transformation stage 100 such that no effective short circuit is created. Thus no proper transformation to an open circuit impedance at the signal input 102 of the multiband transformation stage 100 can be achieved. This usually effects the matching of the respective transmitters as well as the performance of low-pass filters within a high-power stage coupled to the signal input 102.

This problem of prior art antenna switches is overcome by the implementation of the auxiliary port 62 which allows a fixed termination of the signal output 26 of the multiband transformation stage 14 in transmit modes. By activating the auxiliary port 62 the impedance at node 24 can thus be kept constant. Any transmitter signal will therefore be attenuated due to the isolation provided by the multiband transformation stage 14 and additionally by the isolation of the low-power stage 16 with activated auxiliary port 60. The maximum input power requirements of the receiver filters can be decreased accordingly. High-power receive saw filters are therefore no longer necessary. The size of saw filter structures can thus be reduced. Furthermore, advantages for multi-burst transmit modes as required by general packet radio systems (GPRS) arise.

Up to now the low-band and the high-band transmit mode have been illustrated. Next, the receive mode will be described. The receive mode corresponds to the third state of the signal path 50 within the multiband transformation stage 14. In the receive mode, all pin-diodes D1, D2, D3, D4 are switched off. Therefore, power consumption of the antenna switch 10 is very low in the receive mode.

Since both pin-diodes D1, D2 of the multiband transformation stage 14 are switched off in the third state, the two transmission lines T1, T2 can be considered as a pure transmission line without quarter-wavelength transformer characteristic.

In the receive mode, one of the signal output ports 56, 58, 60, i.e. a respective receiver, is coupled to the antenna port 22 in an impedance-matched manner.

Figure 3B:
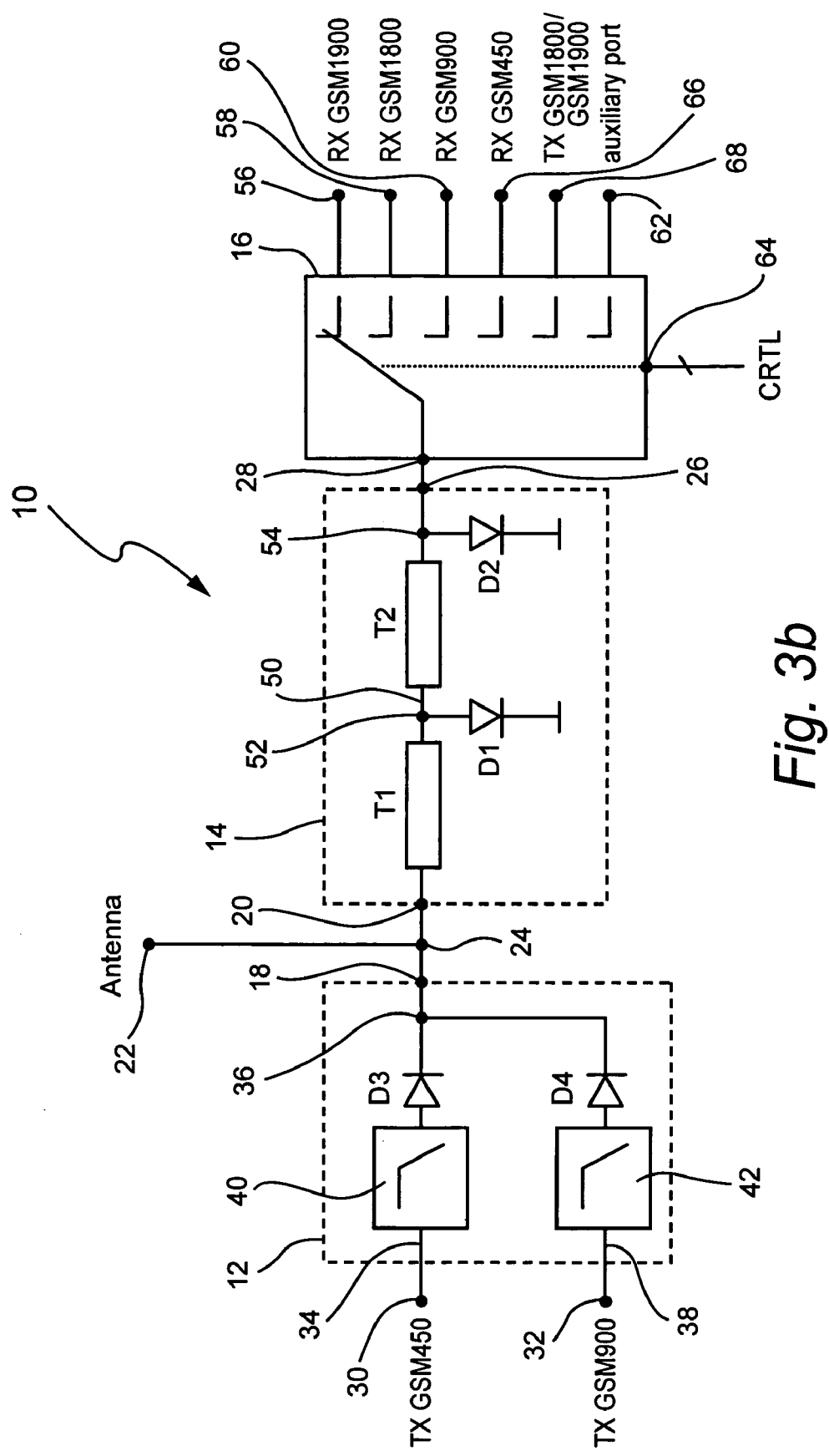
FIG. 3b is a schematic diagram of a quadruple-band antenna switch according another example embodiment.

In FIG. 3b a schematic diagram of the second embodiment of a multiband switching device according to the invention in the form of a quadruple-band antenna switch 10 is illustrated. The antenna switch 10 is part of a mobile telephone operable in four frequency bands in accordance with GSM 450, GSM 900, GSM 1800 and GSM 1900. The antenna switch 10 depicted in FIG. 3b has some similarities with the antenna switch of FIG. 3a. The same reference numbers are thus used for corresponding components.

Again, the antenna switch 10 depicted in FIG. 3b has a modular structure and comprises a high-power stage 12, a multiband transformation stage 14 and a low-power stage 16. The high-power stage 16 is constructed in multi-layer technology and is used as a multiband transmitter switch having a first signal input 30 coupled to a GSM 450 transmitter and a second signal input 32 coupled to a GSM 900 transmitter.

The multiband transformation stage 14 is constructed in multi-layer technology. A first transmission line T1 of the multiband transformation stage 14 is configured to have approximately a quarter-wavelength characteristic for the frequency band of 900 MHz corresponding to GSM 900. A second transmission line D2 of the multiband transformation stage 14 is configured such that the two transmission lines T1 and T2 together have approximately a quarter-wavelength characteristic for the frequency band of 450 MHz corresponding to GSM 450.

The low-power stage 16 is configured as transmit/receive switch matrix with a single signal input/output port 28 coupled to a second signal port 26 of the multiband transformation stage 14, four signal output ports 56, 58, 60, 66, a signal input port 68, an auxiliary port 62 and a control signal input 64. The signal output ports 56, 58, 60, 66 are coupled to a 1900 MHz receiver, a 1800 MHz receiver a 900 MHz receiver and a 450 MHz receiver, respectively. The receivers are not depicted in FIG. 3a. The auxiliary port 62 is terminated with a pre-defined impedance.

The input port 68 of the low-power stage 16 is coupled to either a GSM 1800 transmitter path or to a GSM 1900 transmitter path of a transmitter stage not depicted in FIG. 3b. The maximum transmit power occurring at the signal input 68 is 30 dBm. Thus, the low-power stage 16 may be configured as a GaAs MMIC transmitter/receiver switch matrix. Usually, such GaAs MMIC devices can handle powers up to approximately 30 dBm. Therefore, the value of 30 dBm can serve as a limit with respect to low-power and high-power signals. In future, MMIC devices operable at higher powers will become available. Thus, the limit between low-power signals and high-power signals may shift accordingly.

The operation of the antenna switch 10 depicted in FIG. 3b is similar to the operation of the antenna switch of FIG. 3a. Therefore, a detailed description is omitted. The different operational modes of the antenna switch 10 depicted in FIG. 3b are shown in the following table:

| mode | state of signal path 50 | D1 | D2 |
| --- | --- | --- | --- |
| transmit GSM 450 | 1 | OFF | ON |
| transmit GSM 900 | 2 | ON | OFF |
| transmit GSM 1800/ GSM 1900 | 3 | OFF | OFF |
| receive GSM 450/GSM 900/ GSM 1800/GSM 1900 | 3 | OFF | OFF |

Figure 4:
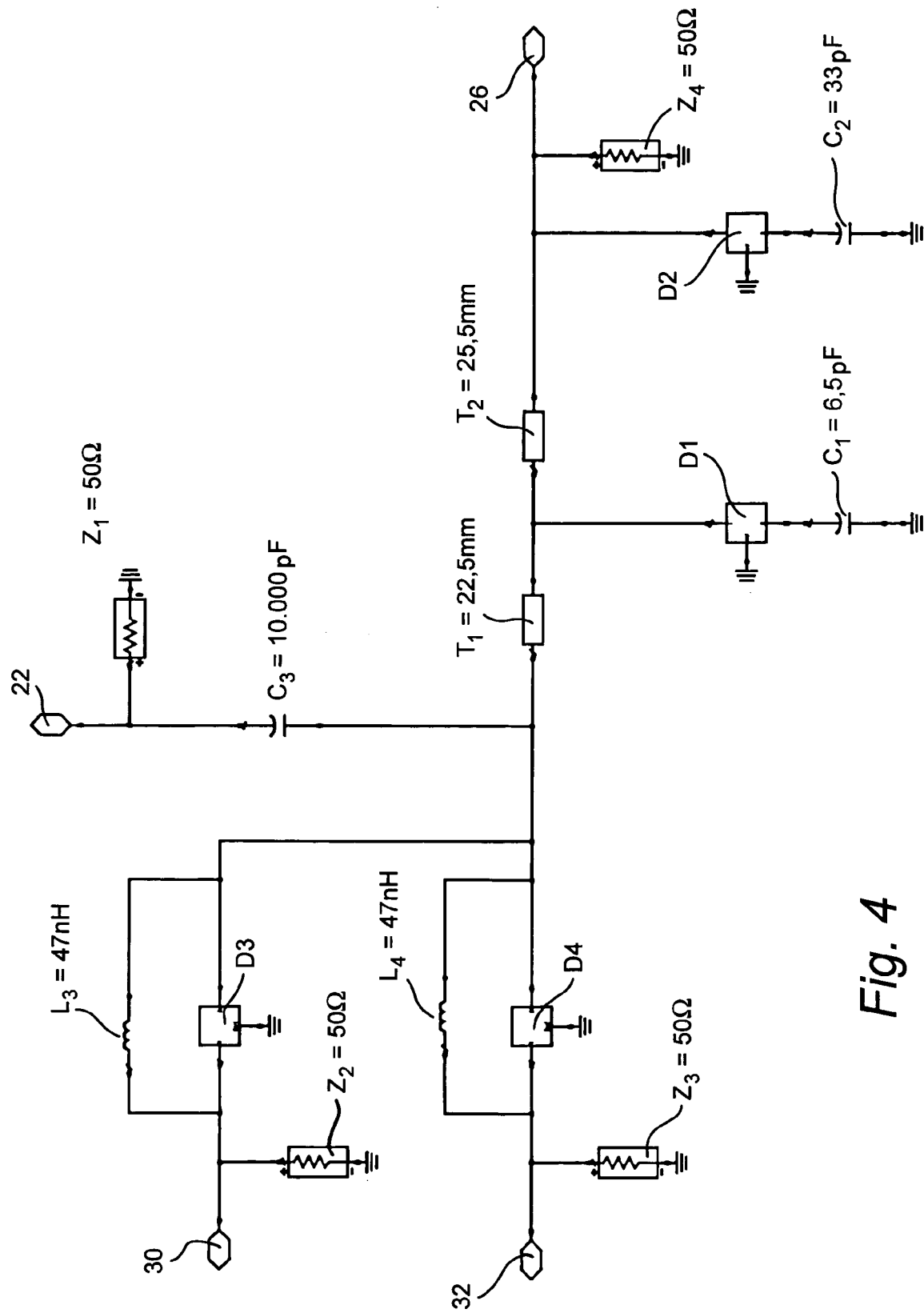
FIG. 4 is a schematic diagram of a basic simulation setup for the triple-band antenna switch of FIG. 3.

In FIG. 4 a simulation setup for the antenna switch 10 depicted in FIG. 3a is shown. The simulation is based on measured S-parameter data of pin-diode BAR 63 and additional simulation models available in the HPADS library as shown in FIG. 5. The simulation does not include the low-power stage 16 for selectively coupling the signal output 26 of the multiband transformation stage 14 to individual receivers or auxiliary ports. Moreover, the low-pass filters 40, 42 of the high-power stage 12 have also not been included into the simulation setup. It should be further noted that the simulation setup does not include any components required for biasing the pin-diodes.

As can be seen in FIG. 4, inductors L3 and L4 are connected in parallel to pin-diodes D3 and D4 in order to improve the isolation to the first and second signal inputs 30, 32 of the high-power stage. In the high-band transmit mode a series resonant circuit consisting of the parasitic inductance of pin-diode D1 and of capacitor C1 is transformed into an open circuit at the antenna port 22. In the low-band transmit mode a short circuit created by the serious resonance circuit consisting of the parasitic inductance of the pin-diode D2 and of capacitor C2 is also transformed into an open circuit at the antenna port 22. The insertion losses calculated based on the simulation model of FIG. 4 are shown in FIG. 6.

While a preferred embodiment of the invention has been illustrated and described, it will be clear that the invention is not limited in this regard. Numerous modifications, changes, variations, substitutions and equivalents will occur to those skilled in the art without departing from the spirit and scope of the present invention as defined by the appended claims.

The invention claimed is:

1. A multiband switching device, comprising:
a multiband transformation stage having
a common first signal port and a common second signal port; and
a signal path coupled between the first signal port and the second signal port, the signal path being switchable via switching elements between a first state with a first quarter wavelength transformer characteristic for a first transmit mode, a second state with a second quarter-wavelength transformer characteristic for a second transmit mode and a third state with a transmission characteristic for a receive mode,
wherein the multiband switching device further comprises a low-power stage comprising
a signal input port coupled to the common second signal port of the multiband transformation stage;
a first signal output port for being coupled to a receiver operating in a first frequency range;
a second signal output port for being coupled to a receiver operating in a second frequency range, the second frequency range differing from the first frequency range;
a third signal output port for being coupled to a receiver operating in a third frequency range, the third frequency range differing from the first and second frequency ranges;
an auxiliary port that is terminated with a pre-determined impedance; and
a signal input to receive a control signal that specifies which of the low-power stage ports is to be coupled to the common second signal port of the multiband transformation stage, wherein, depending on the received frequency range, one of the first, second, and third signal ports is coupled when the multiband transformation stage is in the third state, and wherein the auxillary port is coupled when the multiband transformation stage is in the first and second states.

2. A multiband switching device, comprising:
a) a multiband transformation stage having:
a common first signal port and a common second signal port; and
a signal path coupled between the first signal port and the second signal port, the signal path being switchable between a first state with a first quarter-wavelength transformer characteristic for a first frequency band, a second state with a second quarter-wavelength transformer characteristic for a second frequency band and a third state with a transmission characteristic, wherein the signal path has a first portion coupled between the first signal port of the multi band transformation stage and a first node and a second portion coupled between the first node and the second signal port of the multiband transformation stage, the first portion having a quarter-wavelength characteristic for the first frequency band and the first portion and the second portion together having a quarter-wavelength characteristic for the second frequency band; and
b) a low-power stage coupled to the multiband transformation stage, the low-power stage having:
a first signal port coupled to the second signal port of the multiband transformation stage; and
a plurality of second signal ports which can be coupled to the first signal port of the low-power stage.

3. The multiband switching device according to claim 2, wherein the second portion is coupled between the first node and a second node coupled to the second signal port of the multiband transformation stage, and wherein the muitiband transformation stage further comprises, for switching between the three states, a first switching element coupled to the first node and a second switching element coupled to the second node.

4. The multiband switching device according to claim 2, wherein at least the multiband transformation stage is constructed in multi-layer technology or with discrete components.

5. The multiband switching device according to claim 2, wherein the low-power stage has at least one signal port terminated with a pre-determined impedance.

6. The multiband switching device according to claim 2, wherein at least the low-power stage is a MMIC device.

7. The multiband switching device according to claim 2, wherein the low-power stage is a multiband receiver switch or a multiband transmitter/receiver switch.

8. The multiband switching device according to claim 2, further comprising a high-power stage coupled to the first signal port of the multiband transformation stage.

9. The multiband switching device according to claim 8, further comprising an input/output port, preferably an antenna port, coupled to the high-power stage and the first signal port of the multiband transformation stage.

10. The multiband switching device according to claim 8, wherein the high-power stage is a multiband transmitter switch.

11. The multiband switching device according to claim 8, wherein the high-power stage is constructed in multi-layer technology or with discrete components.

12. A mobile telephone comprising the multiband switching device according to claim 2, the multiband switching device being configured as antenna switch.

13. A low-power switch for a multiband switching device preferably according to claim 2, the low-power switch having a first signal port and a plurailty of second signal ports which may be coupled to the first signal port, wherein at least one signal port is terminated with an impedance which is chosen such that a node of the multiband switching device is terminated in an impedance-matched manner.

* * * * *

UNITED STATES PATENT AND TRADEMARK OFFICE
CERTIFICATE OF CORRECTION

PATENT NO. : 7,005,940 B2 Page 1 of 1
APPLICATION NO. : 10/468916
DATED : February 28, 2006
INVENTOR(S) : Kodim It is certified that error appears in the above-identified patent and that said Letters Patent is hereby corrected as shown below:

On the Title Page, item (75), under "Inventor", in Column 1, Line 1, delete "Nuremberg" and insert -- Nurnberg --, therefor.

In Column 12, Line 26, in Claim 3, delete "muitiband" and insert -- multiband --, therefor.

In Column 12, Line 61, in Claim 13, delete "plurailty" and insert -- plurality --, therefor.

Signed and Sealed this

Thirteenth Day of May, 2008

JON W. DUDAS
*Director of the United States Patent and Trademark Office*